(12) United States Patent
Wei et al.

(10) Patent No.: US 11,125,974 B2
(45) Date of Patent: Sep. 21, 2021

(54) OPTICAL LENS, IMAGING MODULE AND VEHICLE CAMERA

(71) Applicant: JIANGXI LIANCHUANG ELECTRONIC CO., LTD., Nanchang (CN)

(72) Inventors: Wenzhe Wei, Nanchang (CN); Xuming Liu, Nanchang (CN); Jiyong Zeng, Nanchang (CN)

(73) Assignee: JIANGXI LIANCHUANG ELECTRONICS CO., LTD., Nanchang (CN)

( * ) Notice: Subject to any disclaimer, the term of this patent is extended or adjusted under 35 U.S.C. 154(b) by 0 days.

(21) Appl. No.: 16/858,584

(22) Filed: Apr. 25, 2020

(65) Prior Publication Data
US 2020/0257079 A1  Aug. 13, 2020

Related U.S. Application Data

(63) Continuation of application No. PCT/CN2019/106773, filed on Sep. 19, 2019.

(30) Foreign Application Priority Data

Nov. 16, 2018  (CN) .......................... 201811368603.1

(51) Int. Cl.
*G02B 9/64* (2006.01)
*B60R 11/04* (2006.01)
*H04N 5/225* (2006.01)

(52) U.S. Cl.
CPC ................ *G02B 9/64* (2013.01); *B60R 11/04* (2013.01); *H04N 5/2252* (2013.01); *H04N 5/2254* (2013.01)

(58) Field of Classification Search
CPC ............................ G02B 7/028; G02B 13/0015
See application file for complete search history.

(56) References Cited

U.S. PATENT DOCUMENTS 10,067,321 B2   8/2018  Seiya et al.
2011/0063479 A1*  3/2011  Bito ............... G02B 15/144113
                                                            348/240.3
(Continued)

FOREIGN PATENT DOCUMENTS

CN   101930111 A   12/2010
CN   103676114 A    3/2014
(Continued)

OTHER PUBLICATIONS

International Search Report issued in corresponding international application No. PCT/CN2019/106773, dated Dec. 18, 2019 (8 pages).

(Continued)

*Primary Examiner* — Jerry T Jean Baptiste

(57) ABSTRACT

The disclosure provides an optical lens, from an object side to an imaging surface, the optical lens sequentially includes a first lens having a negative refractive power; a second lens having a negative refractive power; a third lens having a positive refractive power; a fourth lens having a positive refractive power; a fifth lens having a positive refractive power; a sixth lens having a negative refractive power; the fifth lens and the sixth lens being cemented into an cemented body; a seventh lens having a positive refractive power; and the optical lens further include a stop, disposed between the second lens and the third lens. The optical lens provided in the present disclosure has a wide-spectrum imaging function. The disclosure further provides an imaging device.

20 Claims, 14 Drawing Sheets

(56) References Cited

U.S. PATENT DOCUMENTS

| | | | |
|---|---|---|---|
| 2016/0252709 A1* | 9/2016 | Lin | G02B 13/0045 348/335 |
| 2017/0090157 A1* | 3/2017 | Tang | G02B 13/0045 |

FOREIGN PATENT DOCUMENTS

| | | |
|---|---|---|
| CN | 104317036 A | 1/2015 |
| CN | 105093487 A | 11/2015 |
| CN | 205485024 U | 8/2016 |
| CN | 106291886 A | 1/2017 |
| CN | 106959499 A | 7/2017 |
| CN | 107367827 A | 11/2017 |
| CN | 107367828 A | 11/2017 |
| CN | 207264008 U | 4/2018 |
| CN | 108445611 A | 8/2018 |
| CN | 108469667 A | 8/2018 |
| CN | 108490584 A | 9/2018 |
| CN | 108646387 A | 10/2018 |
| CN | 108681050 A | 10/2018 |
| CN | 208026984 U | 10/2018 |
| CN | 108781743 A | 11/2018 |
| CN | 108802966 A | 11/2018 |
| CN | 208092317 U | 11/2018 |
| CN | 109541780 A | 3/2019 |
| JP | 2010169792 A | 8/2010 |
| JP | 2017167339 A | 9/2017 |

OTHER PUBLICATIONS

First Office Action issued in corresponding Chinese application No. 201811368603.1, dated Jan. 9, 2020 (19 pages).

Written opinion of International Search Authority issued in corresponding International application No. PCT/CN2019/106773, dated Dec. 18, 2019 (7 pages).

SIPO, Second Office Action for CN Application No. 201811368603.1, dated Apr. 29, 2020.

SIPO, Notification to Grant Patent Right for invention for CN Application No. 2018118603.1, dated Jul. 2, 2020.

* cited by examiner

OPTICAL LENS, IMAGING MODULE AND VEHICLE CAMERA

CROSS REFERENCE TO RELATED APPLICATION(S)

This application is a continuation of International Application No. PCT/CN2019/106773, filed on Sep. 19, 2019, titled "OPTICAL LENS AND IMAGING DEVICE". The International Application No. PCT/CN2019/106773 claims priority to a Chinese application NO. 2018113686031 filed on Nov. 16, 2018, titled "OPTICAL LENS AND IMAGING DEVICE." The entirety of the above-mentioned applications is hereby incorporated by reference herein.

TECHNICAL FIELD

The present disclosure relates to the field of optical imaging technologies, and more particularly, to an optical lens, an imaging module, an imaging device, and a vehicle camera.

BACKGROUND

Optical lens is usually composed of several lenses and are widely used in all aspects of social life. Lenses that combine high performance with low manufacturing costs are always the goal of product development. However, the current optical lens can not meet the requirements, so there is an urgent demand to provide an optical lens that meets the requirements of low manufacturing costs and high performance.

SUMMARY

The present disclosure aims to provide an optical lens, an imaging module, an imaging device and a vehicle camera to solve the above problems.

In the first aspect, the present disclosure provides an optical lens, from an object side to an imaging surface thereof, the optical lens sequentially includes: a first lens having a negative refractive power, an object side surface being a convex surface and an image side surface being a concave surface; a second lens having a negative refractive power, an object side surface being a concave surface; a third lens having a positive refractive power, an object side surface being a convex surface; a fourth lens having a positive refractive power, a fifth lens having a positive refractive power, an object side surface and an image side surface each being convex surfaces; a sixth lens having a negative refractive power, an object side surface and an image side surface each being concave surfaces, the fifth lens and the sixth lens being cemented into an cemented body; a seventh lens having a positive refractive power, and the optical lens further includes a stop, disposed between the second lens and the third lens.

In the second aspect, the present disclosure provides an imaging device, the imaging device includes the optical lens provided in the first aspect and an imaging element for converting optical images formed by the optical lens into electrical signals.

In the third aspect, the present disclosure provides an imaging module, the imaging module includes a barrel, a holder, an image sensor and a printed circuit board. The optical lens is received in the barrel, and the barrel is engaged with the holder. The image sensor and the printed circuit board are substantially accommodated in the holder. The image sensor is located on an imaging surface of the optical lens and is mounted on the printed circuit board. The image sensor and the optical lens cooperated to capture one or more images and the images maybe transmitted to a processor via the printed circuit board.

In the fourth aspect, the disclosure provides a vehicle camera mounted on a vehicle, the vehicle camera includes the imaging module as describe above, the imaging module is configured to capture images of the surroundings of the vehicle. The vehicle camera can be applied to a driverless vehicle system, so that the driverless vehicle system can control the direction or the speed of the vehicle according to the captured images of the surroundings.

Compared with the related art, the optical lens and imaging device provided in the present disclosure have low manufacturing costs and high performance, wherein the first lens and the second lens are configured for light collection and distortion correction, the third lens is configured to eliminate aberrations and converge the lights to reduce the aperture of the lens, the fourth lens and the cemented body formed by the fifth lens and the six lens can eliminate heat difference, secondary spectrum and achromatic, the seventh lens can eliminate aberrations and control the exit angle of the chief ray.

Figure 1:
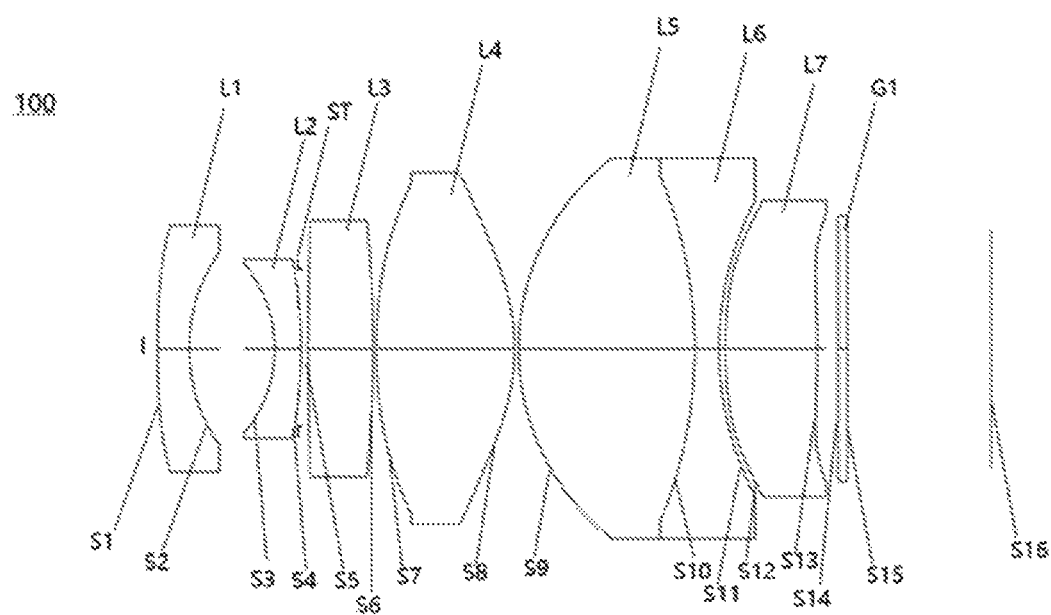
FIG. 1 is a schematic cross-sectional view of an optical lens according to a first embodiment of the present disclosure.

Reference numerals of main components:

| first lens | L1 | second lens | L2 |
| third lens | L3 | fourth lens | L4 |
| fifth lens | L5 | sixth lens | L6 |
| seventh lens | L7 | filter | G1 |
| stop | ST | | |

The following embodiments will further illustrate the present disclosure with reference to the above drawings.

DETAILED DESCRIPTION OF PREFERRED EMBODIMENTS

In order to facilitate the understanding of the present disclosure, the present disclosure will be described more fully hereinafter with reference to the accompanying drawings. Several embodiments of the disclosure are presented in the drawings. However, the disclosure may be embodied in many different forms and is not limited to the embodiments described herein. Rather, these embodiments are provided so that this disclosure will be thorough and comprehensive.

According to production practice, the applicant found that the driverless driving technology needs to be equipped with an optical lens with a field of view (FOV) of larger than 70° and capable of monitoring middle and long distance ranges. Since the complexity of the driving environment, the optical lens needs to be safe and reliable. Therefore, the performance of the optical lens needs to meet some special requirements, for example, a strong light transmission ability which is capable of adapting to brightness/darkness changes in the external environment, a high imaging clarity which can effectively distinguish details of the road environment such as highway signs, pedestrians and vehicles in distance, a good thermal stability which enables the lens has good resolution in high and low temperature environments, and a good resolution for the objects that emit or reflect monochromatic lights of different wavelengths such as signal indicators, highway signs, etc, so as to meet the requirements of a driverless vehicle system.

The present disclosure provides an optical lens, from an object side to an imaging surface thereof, the optical lens sequentially includes: a first lens having a negative refractive power, an object side surface of the first lens being a convex surface and an image side surface of the first lens being a concave surface; a second lens having a negative refractive power, an object side surface of the second lens being a concave surface; a third lens having a positive refractive power, an object side surface of the third lens being a convex surface; a fourth lens having a positive refractive power, a fifth lens having a positive refractive power, an object side surface and an image side surface of the fifth lens each being convex surfaces; a sixth lens having a negative refractive power an object side surface and an image side surface of the sixth lens each being concave surfaces, the fifth lens and the sixth lens being cemented into an cemented body; a seventh lens having a positive refractive power. The optical lens further includes a stop disposed between the second lens and the third lens, and a filter disposed between the seventh lens and the imaging surface.

In some embodiments, the fourth lens and the fifth lens satisfy the following expression:

$$(dn/dt)_4 + (dn/dt)_5 < -3 \times 10^{-6}/° C.;$$

where $(dn/dt)_4$ represents a temperature coefficient of refractive index of the fourth lens, $(dn/dt)_5$ represents a temperature coefficient of refractive index of the fifth lens.

When the temperature coefficients of refractive index of the fourth lens and the fifth lens are both negative values, the focal length of the optical lens can be increased at high temperature and decreased at low temperature, thereby effectively compensating the thermal expansion of the lens components, such as a lens barrel, a lens holder, and ensuring the optical lens has a good performance at high and low temperatures.

In some embodiments, the fourth lens and the fifth lens satisfy the following expressions:

$$Vd_4 - Vd_5 > 100:$$

$$\Delta Pg \cdot F_4 + \Delta Pg \cdot F_5 \geq 0.01:$$

where $Vd_4$ represents the abbe number of the fourth lens, $Vd_5$ represents the abbe number of the fifth lens, $\Delta Pg, F_4$ represents a deviation of relative partial dispersion from the abbe empirical formula of the fourth lens. $\Delta Pg, F_5$ represents a deviation of relative partial dispersion from the abbe empirical formula of the fifth lens.

When the materials of the fourth lens and the fifth lens has the low dispersion and high relative partial dispersion, the fourth lens and the fifth lens can effectively correct the secondary spectrum, reduce the difference in focus distance between different wavelengths of lights, and effectively improve the MTF value of different monochromatic lights in the visible light range, so that the lenses of the present disclosure have good effect on monochromatic lights of respective wavelength in the wide visible light range. It is beneficial to improve the resolution of the optical lens for objects that emit or reflect monochromatic lights of different wavelengths such as signal lights, highway signs, etc.

In some embodiments, in order to enable the optical lens to control the distortion and reduce the imaging deformation caused by the distortion, the optical lens satisfies the following expression:

$$IH/\theta < 0.15;$$

where θ represents half-FOV of the optical lens, and IH represents an image height when the half-FOV is θ. By controlling the f-θ distortion can increase the magnification of the FOV of the lens, thereby improving the resolution of the edge of the lens, so that it has sufficient resolution after the image of the FOV is flattened and expanded.

In some embodiments, in order to effectively eliminate the ghost caused by the second reflection between the first lens and the second lens, and avoid the ghosting of the lenses to interfere with the machine or human eyes recognition, the optical lens satisfies the following expression:

$$0.5 < |r_2 + r_3| < 5;$$

where $r_2$ represents a radius of curvature of an image side surface of the first lens, $r_3$ represents a radius of curvature of an object side surface of the second lens.

In some embodiments, the first lens satisfies the following condition can converge the lights well, which is beneficial to reduce the incident angle of the light thereby reducing partial aberration:

$$-3 < f_1/(r_1 + r_2) < 0;$$

where $f_1$ represents a focal length of the first lens, $r_1$ represents a radius of curvature of an object side surface of the first lens, $r_2$ represents a radius of curvature of an image side surface of the first lens.

In some embodiments, the fourth lens satisfies the following expression can converge the lights well, facilitate to reduce the rear lens diameter, thereby reducing the size of the lens:

$$0 < |f_4/r_5| < 3;$$

where $f_4$ represents a focal length of the fourth lens, $r_8$ represents a radius of curvature of an image side surface of the fourth lens.

In some embodiments, the seventh lens satisfies the following expression can correct aberrations well, beyond the range of the expression, the difficulty of lens processing and the correction of the aberrations will be increased:

$$-2 < f_7/r_{13} < 0;$$

where $f_7$ represents a focal length of the seventh lens, r represents a radius of an image side surface of the seventh lens.

In some embodiments, the seventh lens is a glass aspheric lens, the fifth lens and the sixth lens are glass spherical lenses.

In some embodiments, the fifth lens and the sixth lens cemented into an cemented body, and the difference between the abbe number Vd of the fifth lens and the sixth lens is greater than 35.

Satisfying the above configuration is beneficial to ensure that the optical lens has good thermal stability and excellent wide-spectrum imaging performance. In addition, in some embodiments, f-θ distortion is controlled to increase the magnification of the FOV of the lens, thereby improving the resolution of the edge of the lens, so that it has sufficient resolution after the image of the FOV is flattened and expanded.

Further, the present disclosure provides an imaging device including the optical lens provided in any one of the above embodiments and an imaging element for converting optical images formed by the optical lens into electrical signals. The imaging element can be a Complementary Metal Oxide Semiconductor (CMOS) image sensor or a Charge Coupled Device (CCD) image sensor.

The present disclosure further provides an imaging module, the imaging module includes a barrel, a holder, an image sensor, and a printed circuit board. The optical lens is received in the barrel, and the barrel is engaged with the holder. The image sensor and the printed circuit board are substantially accommodated in the holder. The image sensor is located on an imaging surface of the optical lens and is mounted on the printed circuit board. The image sensor and the optical lens cooperated to capture one or more images and the images maybe transmitted to a processor via the printed circuit board.

The present disclosure further provides a vehicle camera mounted on a vehicle, the vehicle camera includes the imaging module as describe above, the imaging module is configured to capture images of the surroundings of the vehicle. The vehicle camera can be applied to a driverless vehicle system, so that the driverless vehicle system can control the direction or the speed of the vehicle according to the captured images of the surroundings.

The shapes of aspheric surfaces of the optical lens provided by the embodiments of the present disclosure satisfy the following equation:

$$z = \frac{ch^2}{1 + \sqrt{1 - (1+K)c^2 h^2}} + Bh^4 + Ch^6 + Dh^8 + Eh^{10} + Fh^{12};$$

where z represents a vector height between a position on the surface and a vertex of the surface along an optical axis of the lens, c represents a curvature of the vertex of the surface, K is a quadratic surface coefficient, h is a distance between the position on the surface and the optical axis. B is a fourth order surface coefficient. C is a sixth order surface coefficient, D is an eighth order surface coefficient, E is a tenth order surface coefficient, F is a twelfth order surface coefficient.

In the following embodiments, the thickness, radius of curvature, and material selection of each lens in the imaging lens are different. For specific differences, see the parameter table of each embodiment.

First Embodiment

Please refer to FIG. 1, an optical lens 100 provided in a first embodiment of the disclosure, from an object side to an imaging surface, sequentially includes: a first lens L1, a second lens L2, a stop ST, a third lens L3, a fourth lens L4, a fifth lens L5, a sixth lens L6, a seventh lens L7, and a filter G1.

The first lens L1 has a negative refractive power; an object side surface S1 of the first lens L1 is a convex surface, an image side surface S2 of the first lens L1 is a concave surface, and the first lens L1 is a glass aspheric lens. In other embodiments of the disclosure, the first lens L1 can be a glass spherical lens.

The second lens L2 having a negative refractive power, an object side surface S3 of the second lens L2 is a concave surface, an image side surface S4 of the second lens L2 is a convex surface and the second lens L2 is a glass spherical lens.

The third lens L3 has a positive refractive power, an object side surface S5 and an image side surface S6 of the third lens L3 are both convex surfaces, and the third lens L3 is a glass spherical lens.

The fourth lens L4 has a positive refractive power, an object side surface S7 and an image side surface S8 of the fourth lens L4 are both convex surfaces, and the fourth lens L4 is a glass aspheric lens. In other embodiments of the disclosure, the fourth lens L4 can be a glass aspheric lens.

The fifth lens L5 has a positive refractive power, an object side surface S9 and an image side surface S10 of the fifth lens L5 are both convex surfaces.

The sixth lens L6 has a negative refractive power, an object side surface S10 and an image side surface S11 of the sixth lens L6 are both concave surfaces, and the fifth lens L5 and the sixth lens L6 cemented into an cemented body, and both are glass spherical lenses. Specifically, the image side surface S10 of the fifth lens L5 is matched with and bonded to an object side surface S10 of the sixth lens L6, in other words, the fifth lens L5 and the sixth lens L6 are bonded together to form the cemented body also called an achromatic doublet lens.

The seventh lens L7 has a positive refractive power, an object side surface S12 of the seventh lens L7 is a convex surface, an image side surface S13 of the seventh lens L7 is also a convex surface at a position adjacent to the optical axis 1 and the seventh lens L7 is a glass aspheric lens.

The stop ST is disposed between the second lens L2 and the third lens L3, the filter G1 is disposed between the seventh lens L7 and the imaging surface.

Related parameters of each lens in the optical lens 100 are shown in Table 1-1.

TABLE 1-1

| Surface NO. | Sign | Surface type | Radius of curvature | Thickness | Refractive index | Abbe number |
|---|---|---|---|---|---|---|
| Object surface | | Spherical surface | Infinity | Infinity | | |
| S1 | L1 | Aspheric surface | 50.781280 | 1.299267 | 1.589 | 61.25 |
| S2 | | Aspheric surface | 7.731661 | 3.498546 | | |
| S3 | L2 | Spherical surface | −5.434835 | 1.061537 | 1.626 | 35.71 |
| S4 | | Spherical surface | −21.047101 | −0.116924 | | |
| ST | ST | Stop | Infinity | 0.412200 | | |
| S5 | L3 | Spherical surface | 107.930689 | 2.671124 | 1.946 | 17.94 |
| S6 | | Spherical surface | −54.707484 | 0.128999 | | |
| S7 | L4 | Aspheric surface | 20.121017 | 5.660273 | 1.497 | 81.56 |
| S8 | | Aspheric surface | −8.686964 | 0.168983 | | |
| S9 | L5 | Spherical surface | 9.955736 | 7.212610 | 1.618 | 63.41 |
| S10 | L6 | Spherical surface | −18.620210 | 0.998528 | 1.847 | 23.79 |
| S11 | | Spherical surface | 13.338064 | 0.258668 | | |
| S12 | L7 | Aspheric surface | 20.639428 | 3.778075 | 1.808 | 40.92 |
| S13 | | Aspheric surface | −27.638485 | 0.831149 | | |
| S14 | Filter G1 | Spherical surface | Infinity | 0.400000 | 1.517 | 64.21 |
| S15 | | Spherical surface | Infinity | 5.881459 | | |
| S16 | The imaging surface | Imaging surface | Infinity | — | | |

The parameters of the aspheric surfaces of the lenses of this embodiment are shown in Table 1-2.

TABLE 1-2

| Surface NO. | K | B | C | D | E | F |
|---|---|---|---|---|---|---|
| S1 | −9.510854 | 6.908555E−04 | −3.205899E−05 | 1.660043E−06 | −5.037117E−08 | 6.897423E−10 |
| S2 | −0.697519 | 9.667488E−04 | −9.125272E−06 | −1.491238E−06 | 1.974831E−07 | −7.304370E−09 |
| S7 | 4.877175 | 5.212378E−05 | 1.810192E−06 | −1.313017E−07 | 2.015153E−09 | −1.526458E−11 |
| S8 | −1.819663 | 1.109938E−04 | 1.645585E−06 | 5.343278E−08 | −2.141557E−09 | 1.622466E−11 |
| S12 | −3.714801 | 9.342116E−04 | −1.586844E−05 | 2.983459E−07 | −4.839149E−09 | −1.187250E−11 |
| S13 | −6.251436 | 9.221279E−04 | −4.213000E−06 | 5.570274E−07 | −1.205214E−08 | −2.907915E−11 |

Figure 2:
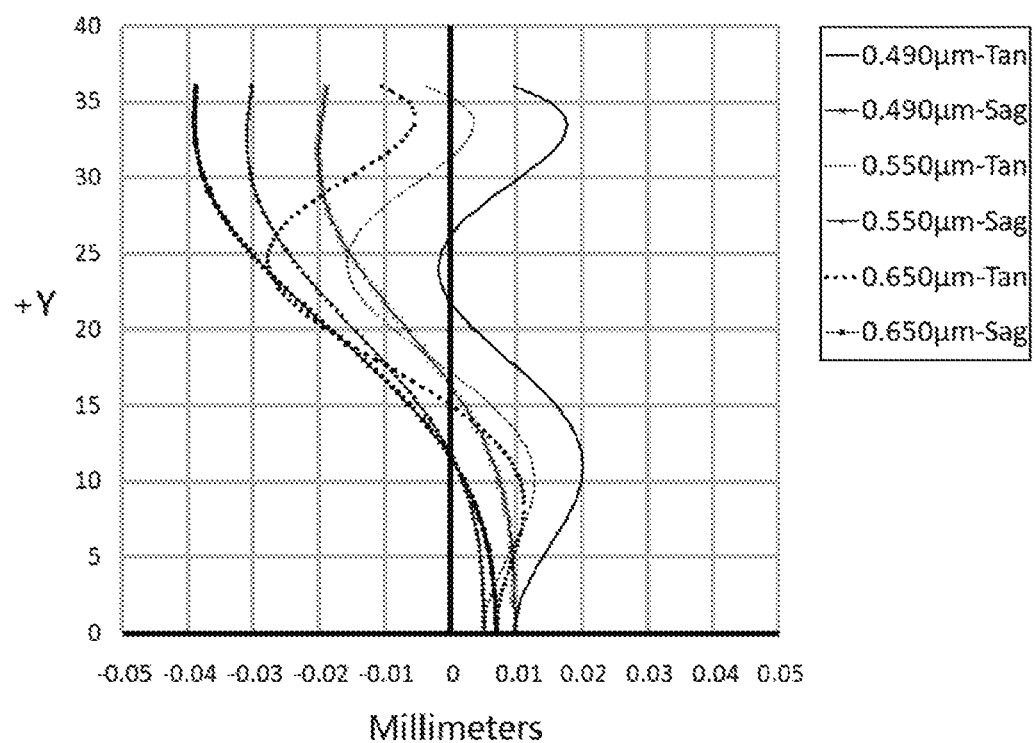
FIG. 2 is a field curvature diagram of the optical lens according to the first embodiment of the present disclosure.
Figure 3:
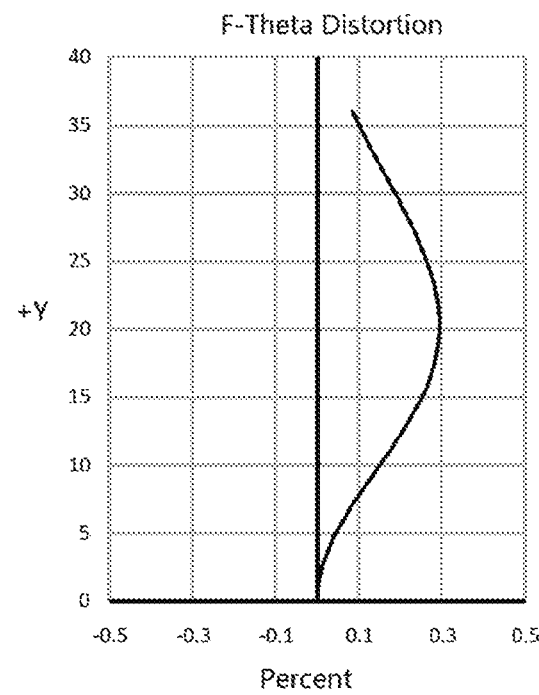
FIG. 3 is a distortion diagram of the optical lens according to the first embodiment of the present disclosure.
Figure 4:
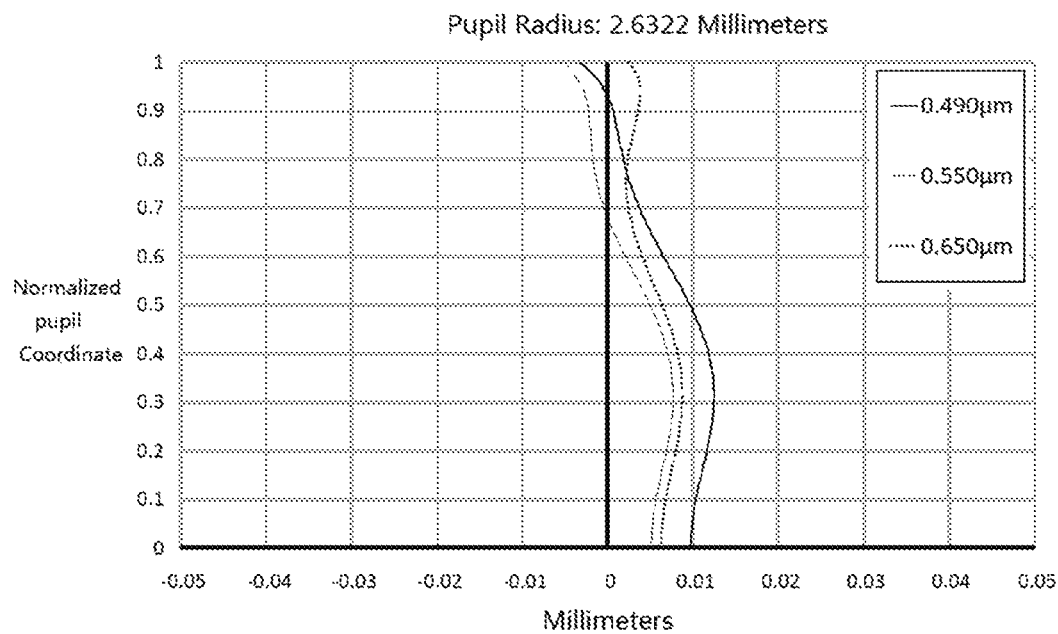
FIG. 4 is an axial chromatic aberration diagram of the optical lens according to the first embodiment of the present disclosure.

In this embodiment, the field curvature, the distortion and the axial chromatic aberration are respectively shown in FIG. 2, FIG. 3 and FIG. 4. As can be seen from FIG. 2 to FIG. 4, the field curvature, the distortion and the chromatic aberration can be well corrected in this embodiment.

Second Embodiment

Figure 5:
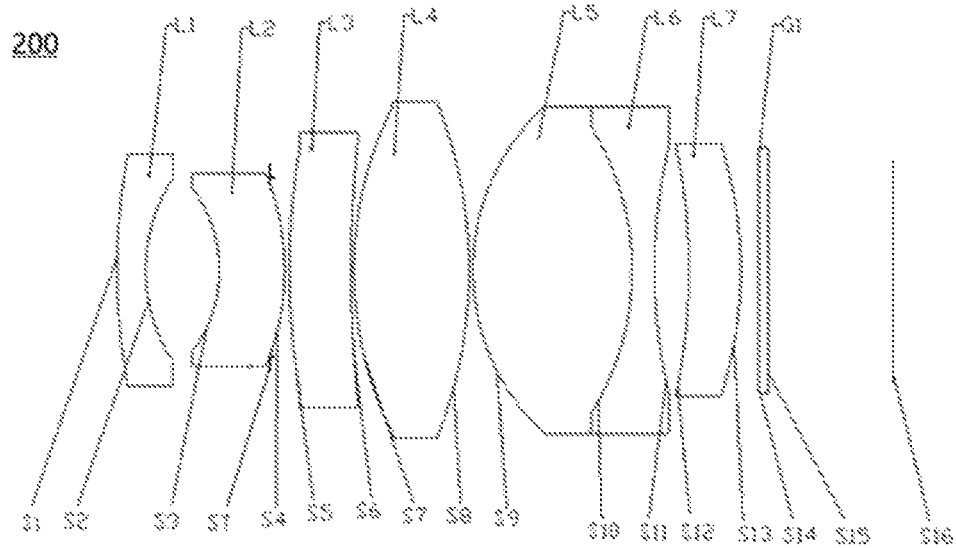
FIG. 5 is a schematic cross-sectional view of the optical lens according to a second embodiment of the present disclosure.

Please refer to FIG. 5, which is a structural diagram of an optical lens 200 provided in this embodiment. The optical lens 200 in this embodiment is substantially similar to the optical lens 100 in the first embodiment expect that; an image side surface S6 of a third lens L3 of the optical lens 200 is a concave surface, an object side surface S12 of a seventh lens L7 is a concave surface, an image side surface S13 of the seventh lens L7 is a convex surface, and the curvature radius and the materials of each lens are different. Related parameters of each lens are shown in Table 2-1.

TABLE 2-1

| Surface NO. | Sign | Surface type | Radius of curvature | Thickness | Refractive index | Abbe number |
|---|---|---|---|---|---|---|
| Object surface | | Spherical surface | Infinity | Infinity | | |
| S1 | L1 | Aspheric surface | 50.499432 | 1.299489 | 1.589 | 61.25 |
| S2 | | Aspheric surface | 7.800491 | 3.312554 | | |
| S3 | L2 | Spherical surface | −5.667473 | 2.929372 | 2.001 | 25.44 |
| S4 | | Spherical surface | −10.570456 | −0.651382 | | |
| ST | ST | Stop | Infinity | 0.860963 | | |
| S5 | L3 | Spherical surface | 30.255461 | 2.766230 | 1.946 | 17.94 |
| S6 | | Spherical surface | 50.760376 | 0.129613 | | |
| S7 | L4 | Aspheric surface | 16.948976 | 5.187864 | 1.589 | 66.23 |
| S8 | | Aspheric surface | −14.130898 | 0.169633 | | |
| S9 | L5 | Spherical surface | 9.359726 | 7.154477 | 1.618 | 63.41 |
| S10 | L6 | Spherical surface | −11.277609 | 0.999766 | 1.847 | 23.79 |
| S11 | | Spherical surface | 22.291815 | 1.550446 | | |
| S12 | L7 | Aspheric surface | −84.059464 | 2.327289 | 1.808 | 40.92 |
| S13 | | Aspheric surface | −14.877828 | 0.831149 | | |
| S14 | Filter G1 | Spherical surface | Infinity | 0.400000 | 1.517 | 64.21 |
| S15 | | Spherical surface | Infinity | 4.971578 | | |
| S16 | The imaging surface | Imaging surface | Infinity | — | | |

The parameters of the aspheric surfaces of the lenses of this embodiment are shown in Table 2-2.

TABLE 2-2

| Surface NO. | K | B | C | D | E | F |
|---|---|---|---|---|---|---|
| S1 | 1.751149 | 6.624817E−04 | −3.026383E−05 | 1.435662E−06 | −4.202835E−08 | 6.028284E−10 |
| S2 | −1.894639 | 1.338660E−03 | −2.596178E−05 | 2.942500E−07 | 7.045505E−08 | −3.632158E−09 |
| S7 | −0.916021 | 1.677979E−04 | 1.580561E−07 | −3.772219E−08 | 5.732374E−10 | −7.445181E−12 |
| S8 | −1.874161 | 1.633487E−04 | 7.871486E−07 | 1.358331E−08 | −1.087588E−09 | 4.371102E−12 |
| S12 | −0.356541 | 2.596062E−05 | −2.000934E−05 | 3.239261E−07 | −2.895662E−08 | 6.953990E−10 |
| S13 | −2.795022 | 3.317761E−04 | −1.304239E−05 | 1.995792E−07 | −9.388518E−09 | 2.428816E−10 |

Figure 6:
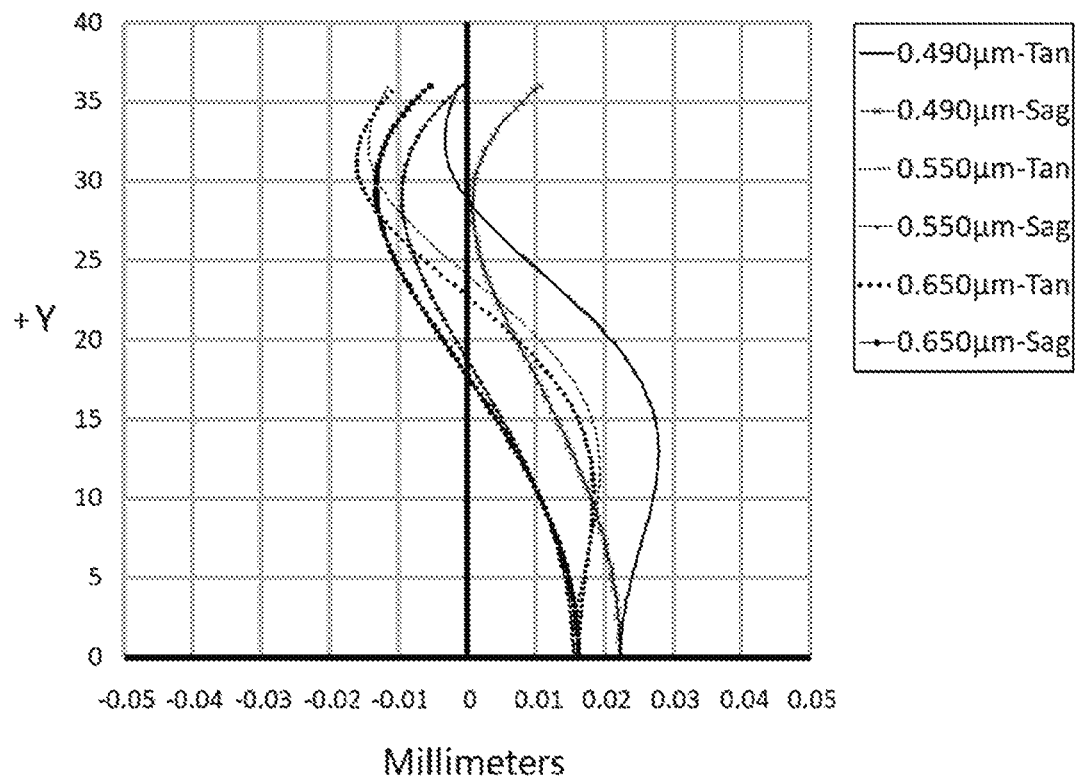
FIG. 6 is a field curvature diagram of the optical lens according to the second embodiment of the present disclosure.
Figure 7:
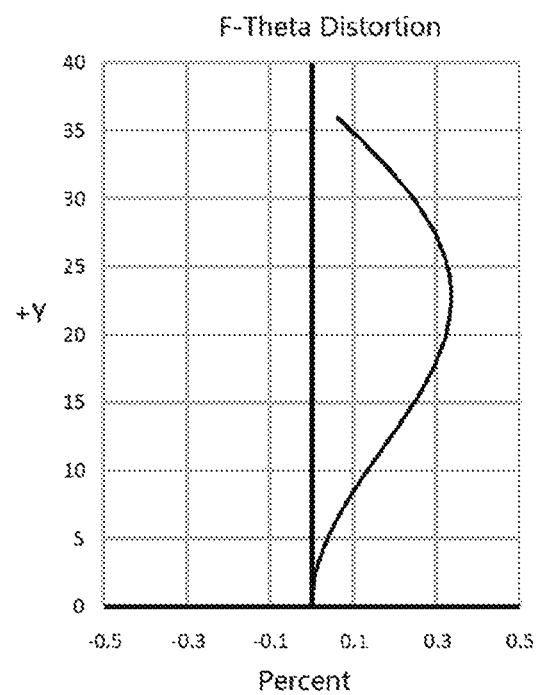
FIG. 7 is a distortion diagram of the optical lens according to the second embodiment of the present disclosure.
Figure 8:
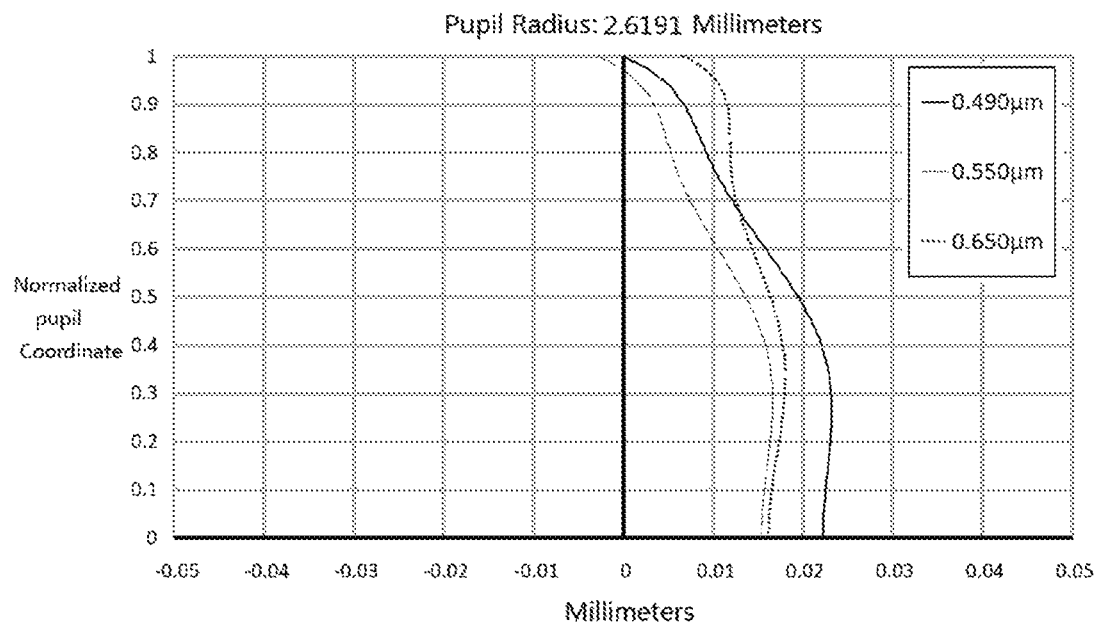
FIG. 8 is an axial chromatic aberration diagram of the optical lens according to the second embodiment of the present disclosure.

In this embodiment, the field curvature, the distortion and the axial chromatic aberration are respectively shown in FIG. 6, FIG. 7 and FIG. 8. As can be seen from FIG. 6 to FIG. 8, the field curvature, the distortion and the chromatic aberration can be well corrected in this embodiment.

Third Embodiment

Figure 9:
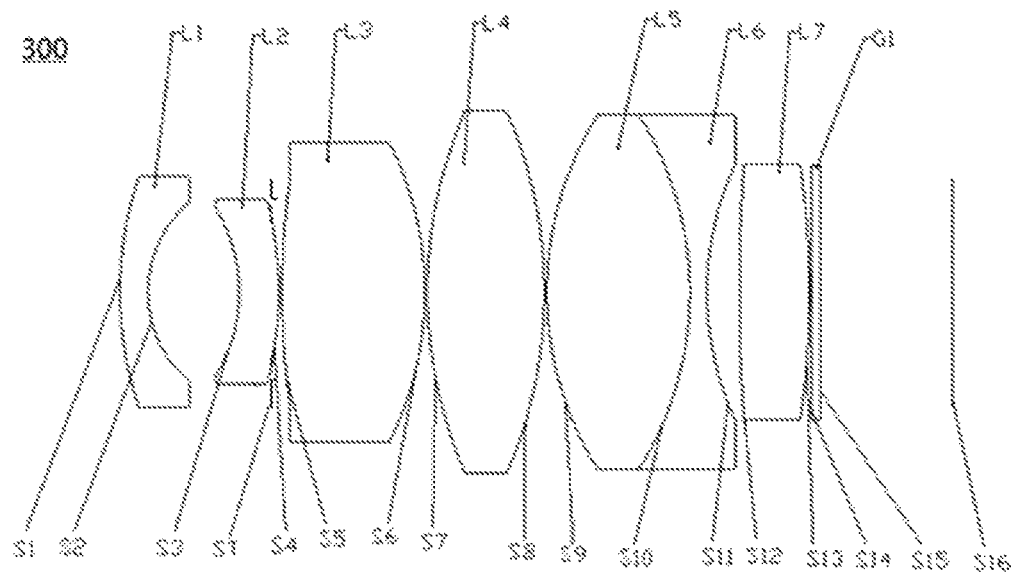
FIG. 9 is a schematic cross-sectional view of the optical lens according to a third embodiment of the present disclosure.

Please refer to FIG. 9, which is a structural diagram of an optical lens 300 provided in this embodiment. The optical lens 300 in this embodiment is substantially similar to the optical lens 100 in the first embodiment expect that: a third lens L3 of the optical lens 300 is a glass aspheric lens, a fourth lens L4 is a glass spherical lens, and the curvature radius and the materials of each lens are different. Related parameters of each lens are shown in Table 3-1.

TABLE 3-1

| Surface No. | Sign | Surface type | Radius of curvature | Thickness | Refractive index | Abbe number |
|---|---|---|---|---|---|---|
| Object surface | | Spherical surface | Infinity | Infinity | | |
| S1 | L1 | Aspheric surface | 9.800967 | 1.171894 | 1.589 | 61.25 |
| S2 | | Aspheric surface | 4.301948 | 3.846289 | | |
| S3 | L2 | Spherical surface | −6.772723 | 1.653021 | 1.834 | 37.23 |
| S4 | | Spherical surface | −16.031836 | −0.334874 | | |
| ST | ST | Stop | Infinity | 0.476464 | | |
| S5 | L3 | Aspheric surface | 43.931024 | 6.018354 | 1.693 | 53.20 |
| S6 | | Aspheric surface | −11.745960 | 0.096731 | | |
| S7 | L4 | Spherical surface | 19.126791 | 4.934849 | 1.593 | 67.33 |
| S8 | | Spherical surface | −19.126791 | 0.096024 | | |
| S9 | L5 | Spherical surface | 14.091350 | 6.014943 | 1.593 | 68.53 |
| S10 | L6 | Spherical surface | −14.091350 | 0.724820 | 1.808 | 22.69 |
| S11 | | Spherical surface | 12.839289 | 1.349242 | | |
| S12 | L7 | Aspheric surface | 70.376352 | 2.957410 | 1.808 | 40.92 |
| S13 | | Aspheric surface | −22.534841 | 0.100000 | | |
| S14 | Filter G1 | Spherical surface | Infinity | 0.400000 | 1.517 | 64.21 |
| S15 | | Spherical surface | Infinity | 4.870263 | | |
| S16 | The imaging surface | Imaging surface | Infinity | — | | |

The parameters of the aspheric surfaces of the lenses of this embodiment are shown in Table 3-2.

TABLE 3-2

| Surface No. | K | B | C | D | E | F |
|---|---|---|---|---|---|---|
| S1 | −12.386582 | 3.087681E−04 | −3.064544E−05 | 1.197311E−06 | −2.663580E−08 | 1.847957E−10 |
| S2 | −2.875540 | 2.467892E−03 | −5.509082E−05 | 1.400617E−06 | 1.004365E−07 | −3.634464E−09 |
| S5 | 17.772143 | 6.503297E−05 | 1.631354E−06 | 1.873389E−08 | 1.240952E−10 | 1.194984E−11 |
| S6 | −0.293778 | 9.058260E−05 | 6.749282E−07 | 4.980426E−08 | −1.209809E−09 | 2.674219E−11 |
| S12 | 16.214354 | 2.581200E−04 | −4.768800E−06 | −4.835981E−08 | −6.780319E−09 | 1.327071E−I0 |
| S13 | 2.055088 | 5.529081E−04 | −3.293814E−06 | −1.966177E−08 | −9.539894E−09 | 1.969424E−10 |

Figure 10:
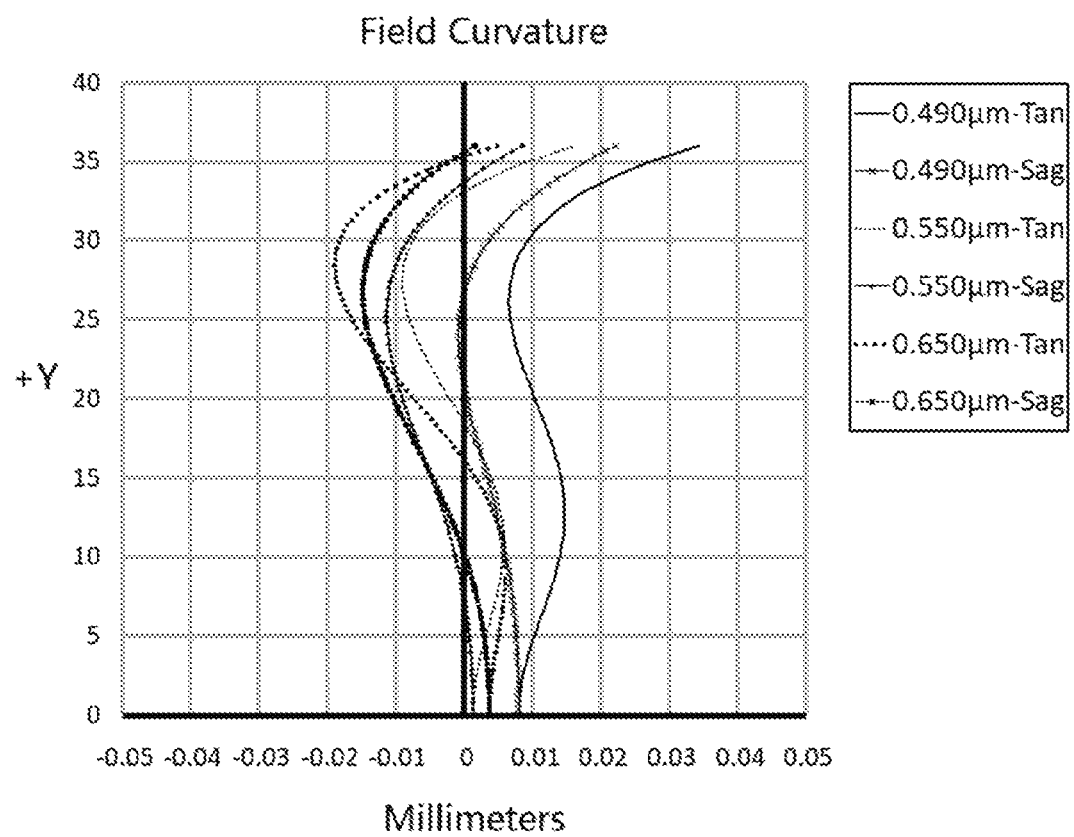
FIG. 10 is a field curvature diagram of the optical lens according to the third embodiment of the present disclosure.
Figure 11:
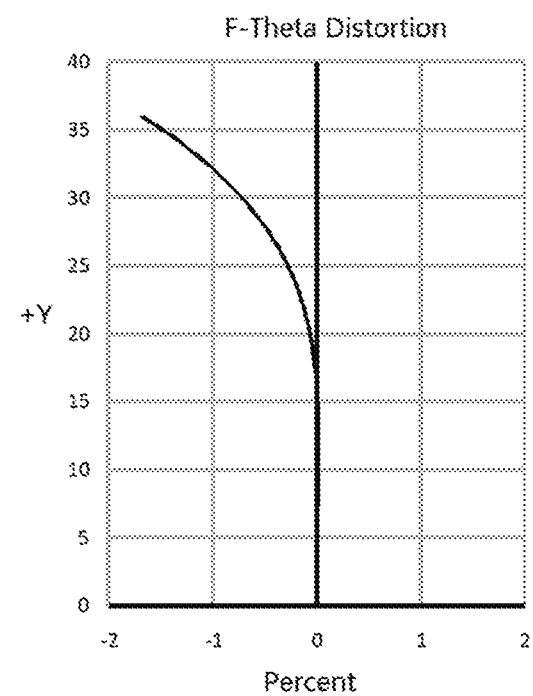
FIG. 11 is a distortion diagram of the optical lens according to the third embodiment of the present disclosure.
Figure 12:
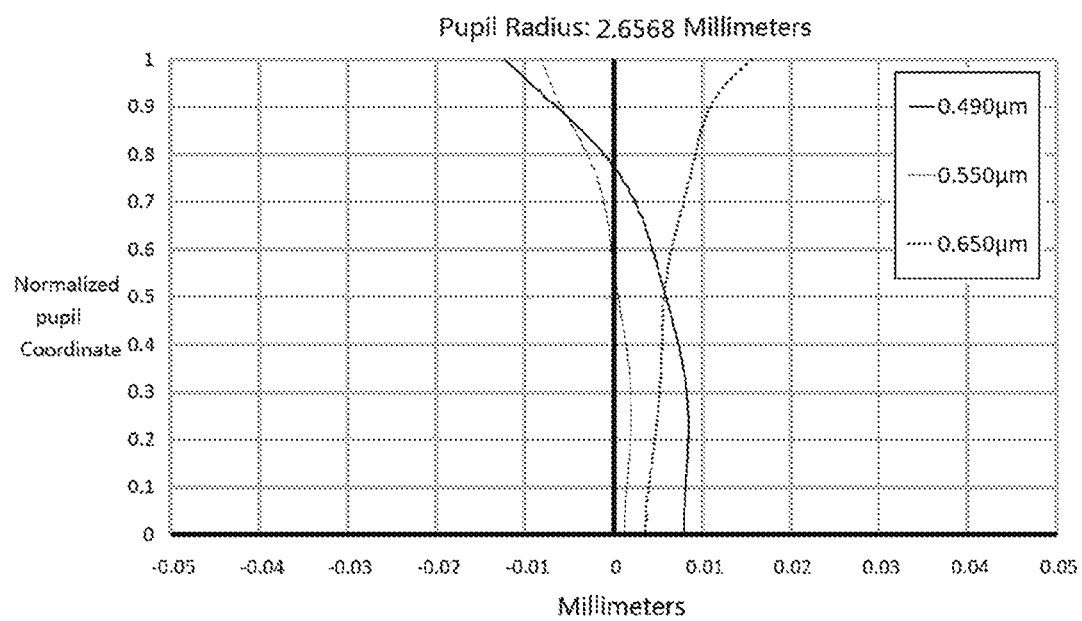
FIG. 12 is an axial chromatic aberration diagram of the optical lens according to the third embodiment of the present disclosure.

In this embodiment, the field curvature, the distortion and the axial chromatic aberration are respectively shown in FIG. 10. FIG. 11 and FIG. 12. As can be seen from FIG. 10 to FIG. 12, the field curvature, the distortion and the chromatic aberration can be well corrected in this embodiment.

Fourth Embodiment

Figure 13:
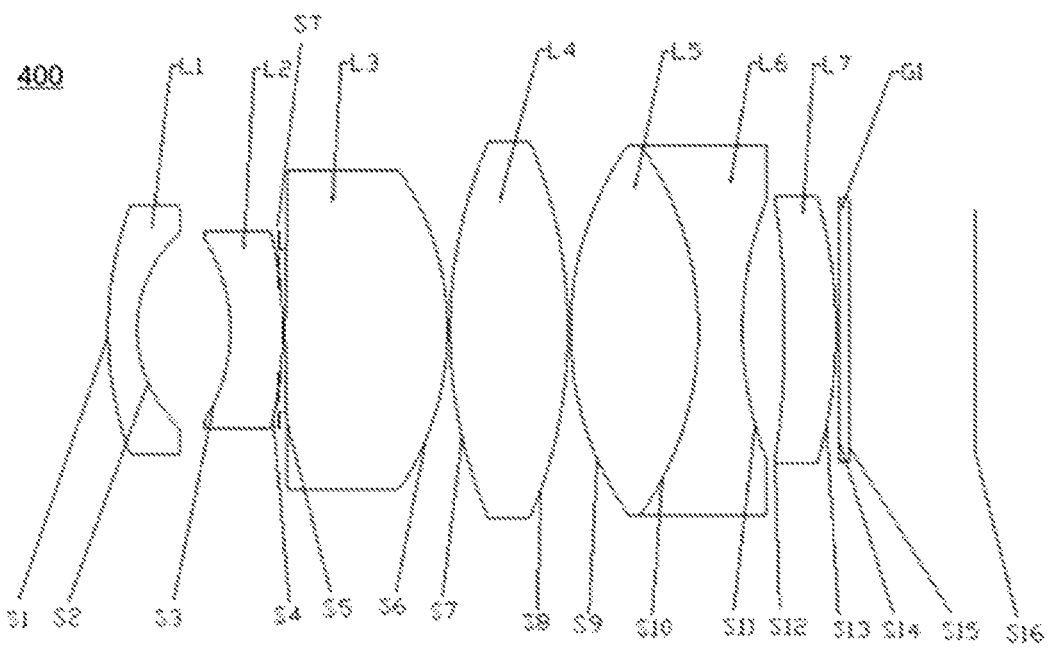
FIG. 13 is a schematic cross-sectional view of the optical lens according to a fourth embodiment of the present disclosure.

Please refer to FIG. 13, which is a structural diagram of an optical lens 400 provided in this embodiment. The optical lens 400 in this embodiment is substantially similar to the optical lens 100 in the first embodiment expect that: a third lens L3 of the optical lens 400 is a glass aspheric lens, a fourth lens L4 is a glass spherical lens, an object side surface S12 of a seventh lens L7 is a concave surface, an image side surface S13 of the seventh lens L7 is a convex surface, and the curvature radius and the materials of each lens are different. Related parameters of each lens are shown in Table 4-1.

TABLE 4-1

| Surface No. | Sign | Surface type | Radius of curvature | Thickness | Refractive index | Abbe number |
|---|---|---|---|---|---|---|
| Object surface | | Spherical surface | Infinity | Infinity | | |
| S1 | L1 | Aspheric surface | 10.178135 | 1.171894 | 1.589 | 61.25 |
| S2 | | Aspheric surface | 4.698160 | 3.781413 | | |
| S3 | L2 | Spherical surface | −6.844972 | 2.111302 | 1.834 | 37.23 |
| S4 | | Spherical surface | −16.119849 | −0.158621 | | |
| ST | ST | Stop | Infinity | 0.241873 | | |
| S5 | L3 | Aspheric surface | 59.227555 | 6.569065 | 1.693 | 53.20 |
| S6 | | Aspheric surface | −11.792889 | 0.096731 | | |
| S7 | L4 | Spherical surface | 19.381807 | 4.769749 | 1.593 | 68.53 |
| S8 | | Spherical surface | −19.381807 | 0.096024 | | |
| S9 | L5 | Spherical surface | 13.118754 | 5.169041 | 1.593 | 67.33 |
| S10 | L6 | Spherical surface | −13.118754 | 1.777606 | 1.847 | 23.79 |
| S11 | | Spherical surface | 14.506098 | 1.711194 | | |
| S12 | L7 | Aspheric surface | −196.005105 | 2.073090 | 1.808 | 40.92 |
| S13 | | Aspheric surface | −21.352003 | 0.131149 | | |
| S14 | Filter G1 | Spherical surface | Infinity | 0.400000 | 1.517 | 64.21 |
| S15 | | Spherical surface | Infinity | 4.496097 | | |
| S16 | The imaging surface | Imaging surface | Infinity | — | | |

The parameters of the aspheric surfaces of the lenses of this embodiment are shown in Table 4-2.

TABLE 4-2

| Surface No. | K | B | C | D | E | F |
|---|---|---|---|---|---|---|
| S1 | −12.386582 | 4.796632E−04 | −3.902496E−05 | 1.863322E−06 | −5.370937E−08 | 6.500382E−10 |
| S2 | −3.434043 | 2.662447E−03 | −1.070411E−04 | 6.373986E−06 | −2.094994E−07 | 3.974173E−09 |
| S5 | −1.306176 | −1.419394E−04 | −1.355205E−06 | −6.802549E−08 | 1.142747E−09 | −1.152135E−12 |
| S6 | 0.004537 | 1.434686E−05 | −8.756335E−07 | 1.561207E−08 | −6.210864E−10 | 5.881461E−12 |
| S12 | 5.134182 | −1.025321E−05 | −1.434796E−05 | 2.167668E−07 | −1.756371E−08 | 2.599572E−10 |
| S13 | −12.013158 | 1.700184E−04 | −1.226633E−05 | 2.194448E−07 | −1.588509E−08 | 2.762758E−10 |

Figure 14:
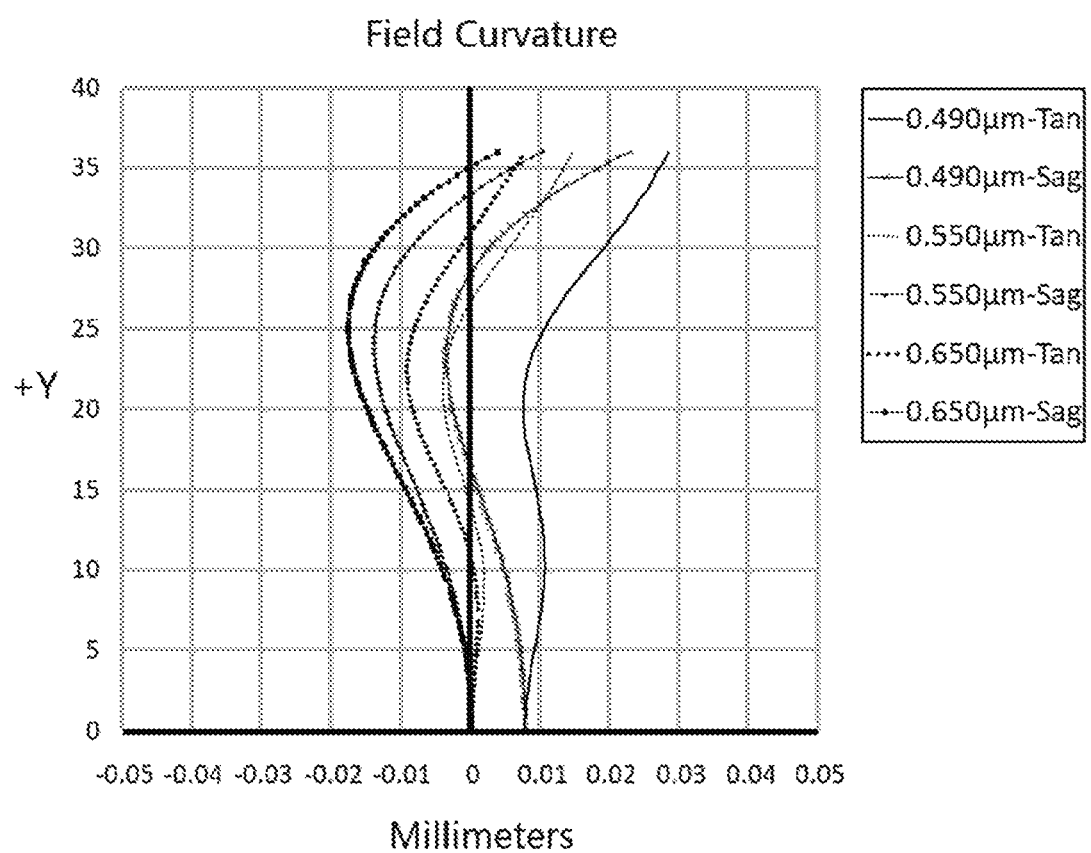
FIG. 14 is a field curvature diagram of the optical lens according to the fourth embodiment of the present disclosure.
Figure 15:
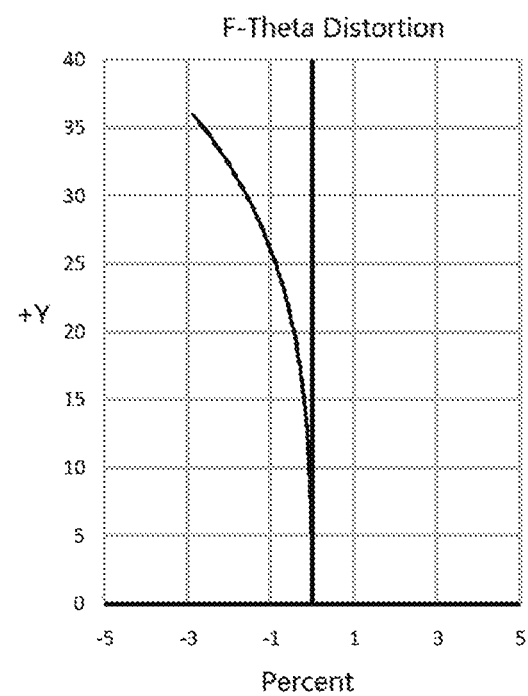
FIG. 15 is a distortion diagram of the optical lens according to the fourth embodiment of the present disclosure.
Figure 16:
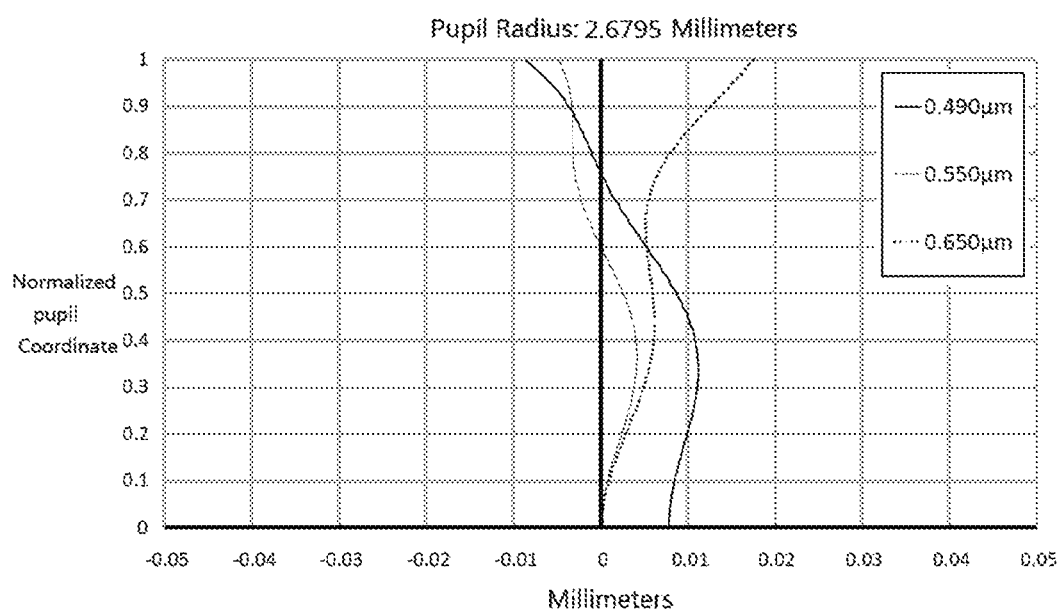
FIG. 16 is an axial chromatic aberration diagram of the optical lens according to the fourth embodiment of the present disclosure.

In this embodiment, the field curvature, the distortion and the axial chromatic aberration are respectively shown in FIG. 14. FIG. 15 and FIG. 16. As can be seen from FIG. 14 to FIG. 16, the field curvature, the distortion and the chromatic aberration can be well corrected in this embodiment.

Fifth Embodiment

Figure 17:
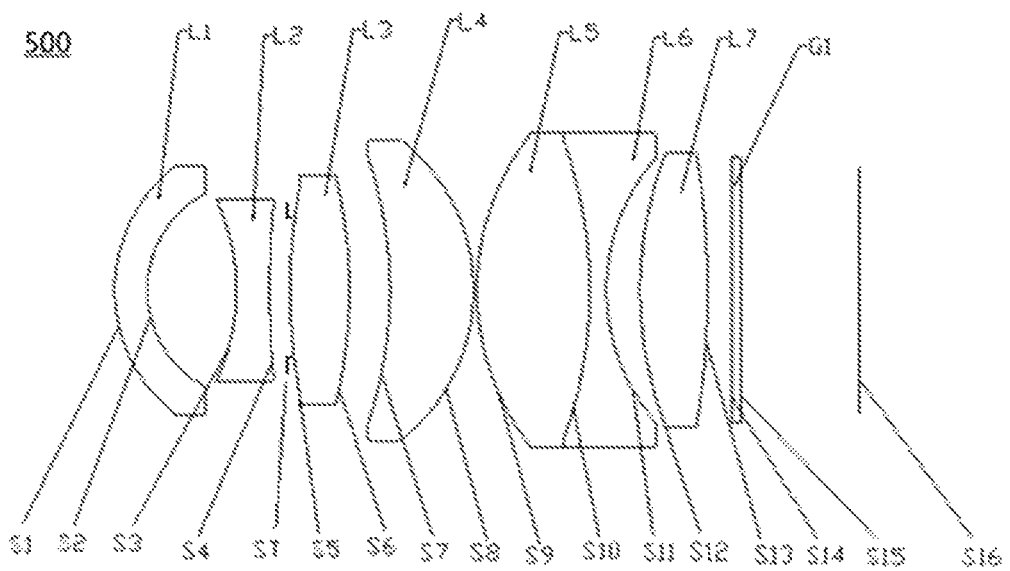
FIG. 17 is a schematic cross-sectional view of the optical lens according to a fifth embodiment of the present disclosure.

Please refer to FIG. 17, which is a structural diagram of an optical lens 500 provided in this embodiment. The optical lens 500 in this embodiment is substantially the same as the optical lens 100 in the first embodiment expect that: a first lens L1 of the optical lens 500 is a glass spherical lens, an image side surface S4 of a second lens L2 is a concave surface, a third lens L3 is a glass aspheric lens, a fourth lens L4 is a glass spherical lens and an object side surface S7 of the fourth lens L4 is a concave surface, and the curvature radius and the materials of each lens are different. Related parameters of each lens are shown in Table 5-1.

TABLE 5-1

| Surface No. | Sign | Surface type | Radius of curvature | Thickness | Refractive index | Abbe number |
|---|---|---|---|---|---|---|
| Object surface | | Spherical surface | Infinity | Infinity | | |
| S1 | L1 | Spherical surface | 6.196381 | 1.271807 | 1.911 | 35.26 |
| S2 | | Spherical surface | 4.296043 | 3.515786 | | |
| S3 | L2 | Spherical surface | −8.492503 | 1.306414 | 1.626 | 35.71 |
| S4 | | Spherical surface | 40.086966 | 0.703491 | | |
| ST | ST | Stop | Infinity | 0.101545 | | |
| S5 | L3 | Aspheric surface | 27.399089 | 2.3335.37 | 1.808 | 40.92 |
| S6 | | Aspheric surface | −11.236495 | 1.597749 | | |
| S7 | L4 | Spherical surface | −16.266689 | 3.298138 | 1.728 | 28.32 |
| S8 | | Spherical surface | −7.512488 | 0.127541 | | |
| S9 | L5 | Spherical surface | 10.021543 | 4.447455 | 1.618 | 63.41 |
| S10 | L6 | Spherical surface | −17.072280 | 0.648954 | 1.808 | 22.69 |
| S11 | | Spherical surface | 7.914203 | 1.324489 | | |
| S12 | L7 | Aspheric surface | 20.415184 | 2.662823 | 1.808 | 40.92 |
| S13 | | Aspheric surface | −20.570933 | 0.933984 | | |
| S14 | Filter G1 | Spherical surface | Infinity | 0.400000 | 1.517 | 64.21 |
| S15 | | Spherical surface | Infinity | 2.993930 | | |
| S16 | The imaging surface | Imaging surface | Infinity | | | |

The parameters of the aspheric surfaces of the lenses of this embodiment are show in Table 5-2.

TABLE 5-2

| Surface NO. | K | B | C | D | E | F |
|---|---|---|---|---|---|---|
| S5 | −9.619160 | 1.074959E−04 | 2.512772E−05 | −7.335109E−07 | 7.178239E−09 | 0.000000E+00 |
| S6 | −1.135399 | 4.503607E−04 | 1.450567E−05 | 7.114717E−07 | −1.996017E−08 | 0.000000E+00 |
| S12 | −6.637943 | 2.542750E−04 | 5.131690E−06 | −2.381715E−07 | 1.830827E−08 | −2.965439E−10 |
| S13 | 5.737459 | 3.269471E−04 | −1.475951E−06 | −1.264630E−08 | 1.482669E−08 | −2.661821E−10 |

Figure 18:
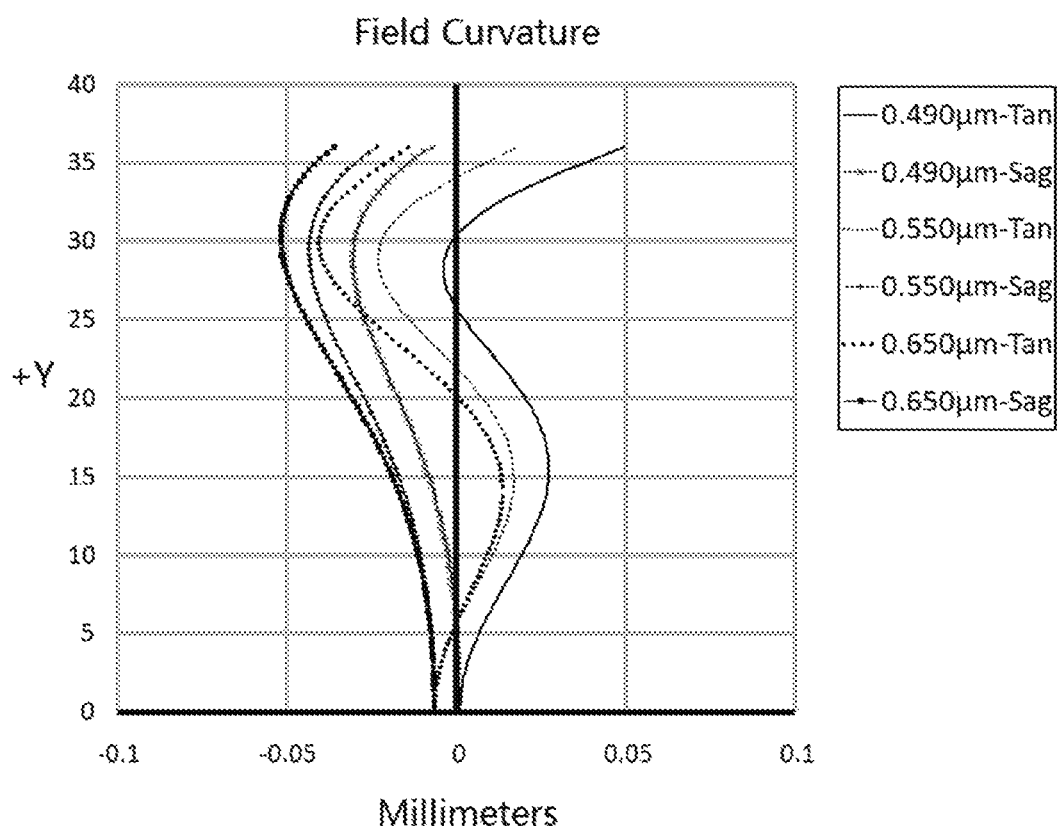
FIG. 18 is a field curvature diagram of the optical lens according to the fifth embodiment of the present disclosure.
Figure 19:
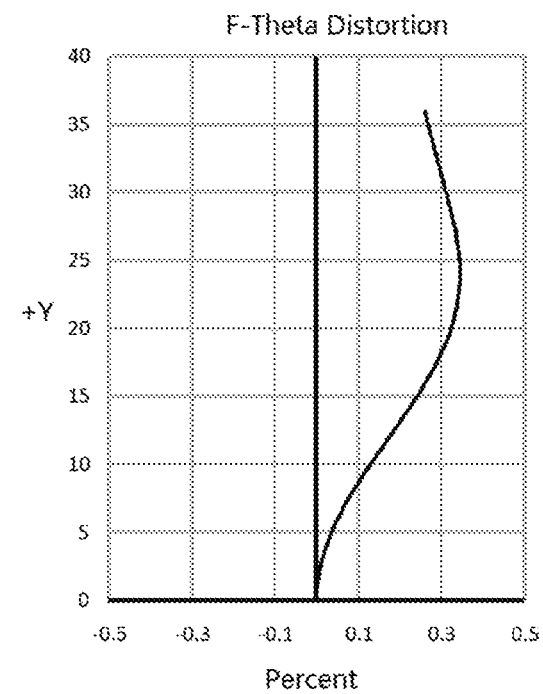
FIG. 19 is a distortion diagram of the optical lens according to the fifth embodiment of the present disclosure.
Figure 20:
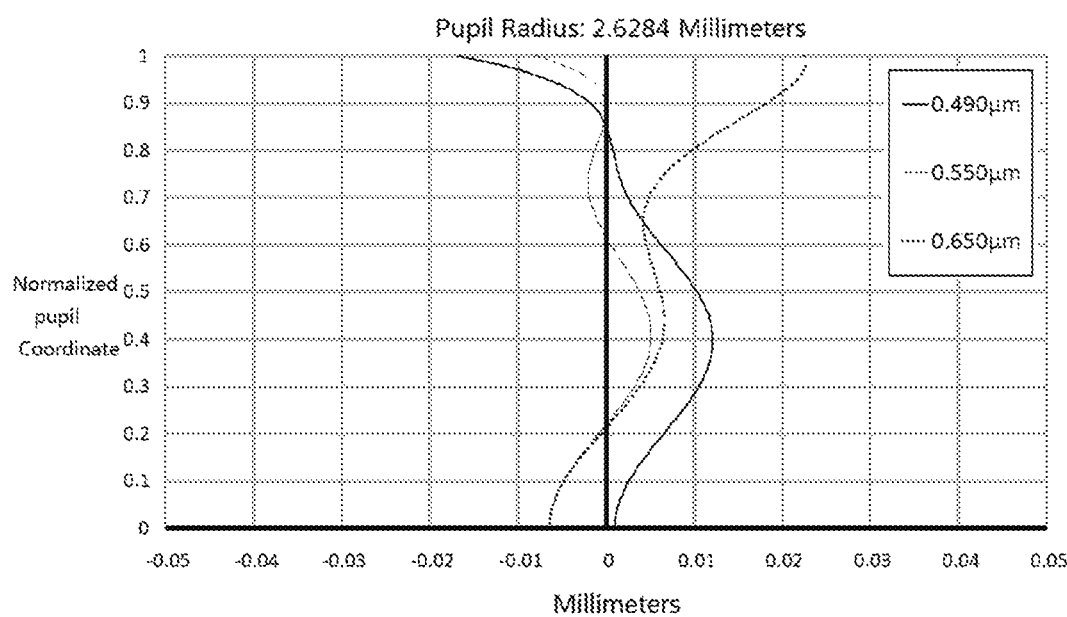
FIG. 20 is an axial chromatic aberration diagram of the optical lens according to the fifth embodiment of the present disclosure.

In this embodiment, the field curvature, the distortion and the axial chromatic aberration are respectively shown in FIG. 18, FIG. 19 and FIG. 20. As can be seen from FIG. 18 to FIG. 20, the field curvature, the distortion and the chromatic aberration can be well corrected in this embodiment.

Sixth Embodiment

Figure 21:
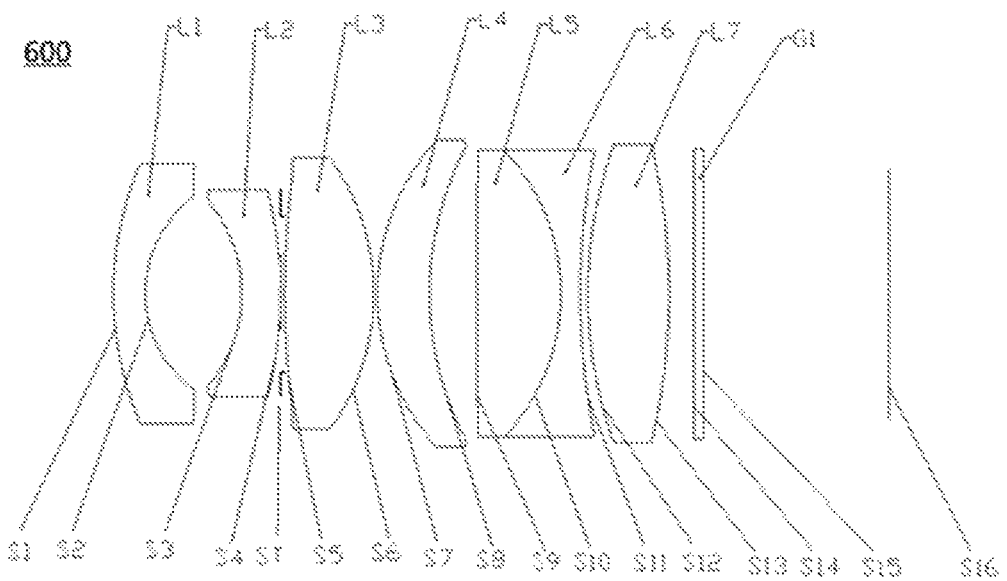
FIG. 21 is a schematic cross-sectional view of the optical lens according to a sixth embodiment of the present disclosure.

Please refer to FIG. 21, which is a structural diagram of an optical lens 600 provided in this embodiment. The optical lens 600 in this embodiment is substantially the same as the optical lens 100 in the first embodiment expect that: a first lens L1 of the optical lens 600 is a glass spherical lens, a fourth lens L4 is a glass spherical lens, and an image side surface S8 of the fourth lens L4 is a concave surface, and the curvature radius and the materials of each lens are different. Related parameters of each lens are shown in Table 6-1.

TABLE 6-1

| Surface NO. | Sign | Surface type | Radius of curvature | Thickness | Refractive index | Abbe number |
|---|---|---|---|---|---|---|
| Object surface | | Spherical surface | Infinity | Infinity | | |
| S1 | L1 | Spherical surface | 12.621338 | 1.236892 | 1.517 | 64.21 |
| S2 | | Spherical surface | 4.647349 | 3.742151 | | |
| S3 | L2 | Spherical surface | −5.515745 | 1.499533 | 1.801 | 34.97 |
| S4 | | Spherical surface | −15.747279 | −0.023027 | | |
| ST | ST | Stop | Infinity | 0.176671 | | |
| S5 | L3 | Spherical surface | 44.636004 | 3.459475 | 1.773 | 49.61 |
| S6 | | Spherical surface | −7.946122 | 0.135205 | | |
| S7 | L4 | Spherical surface | 8.784993 | 2.021740 | 1.805 | 25.46 |
| S8 | | Spherical surface | 12.076868 | 1.848605 | | |
| S9 | L5 | Spherical surface | 619.749958 | 3.246709 | 1.618 | 63.41 |
| S10 | L6 | Spherical surface | −8.043416 | 0.737376 | 1.808 | 22.69 |
| S11 | | Spherical surface | 27.144530 | 0.294395 | | |
| 812 | L7 | Aspheric surface | 17.829886 | 3.152262 | 1.808 | 40.92 |
| S13 | | Aspheric surface | −14.214313 | 0.940169 | | |
| S14 | Filter G1 | Spherical surface | Infinity | 0.400000 | 1.517 | 64.21 |
| S15 | | Spherical surface | Infinity | 6.330069 | | |
| S16 | The imaging surface | Imaging surface | Infinity | — | | |

The parameters of the aspheric surfaces of the lenses of this embodiment are shown in Table 6-2.

TABLE 6-2

| Surface NO. | K | B | C | D | E | F |
|---|---|---|---|---|---|---|
| S5 | 10.000604 | 2.215248E−04 | −6.132582E−07 | −1.787468E−07 | 6.280219E−09 | −1.959891E−10 |
| S6 | 0.670909 | 4.922237E−04 | 4.231187E−06 | 2.689694E−07 | −6.725284E−09 | 1.399011E−10 |
| S12 | −6.299603 | 4.903175E−04 | −9.644373E−06 | 2.836637E−07 | −9.492446E−09 | 1.845928E−11 |
| S13 | 0.077033 | 6.202503E−04 | −6.210854E−06 | 6.669179E−07 | −2.576787E−08 | 2.346206E−10 |

Figure 22:
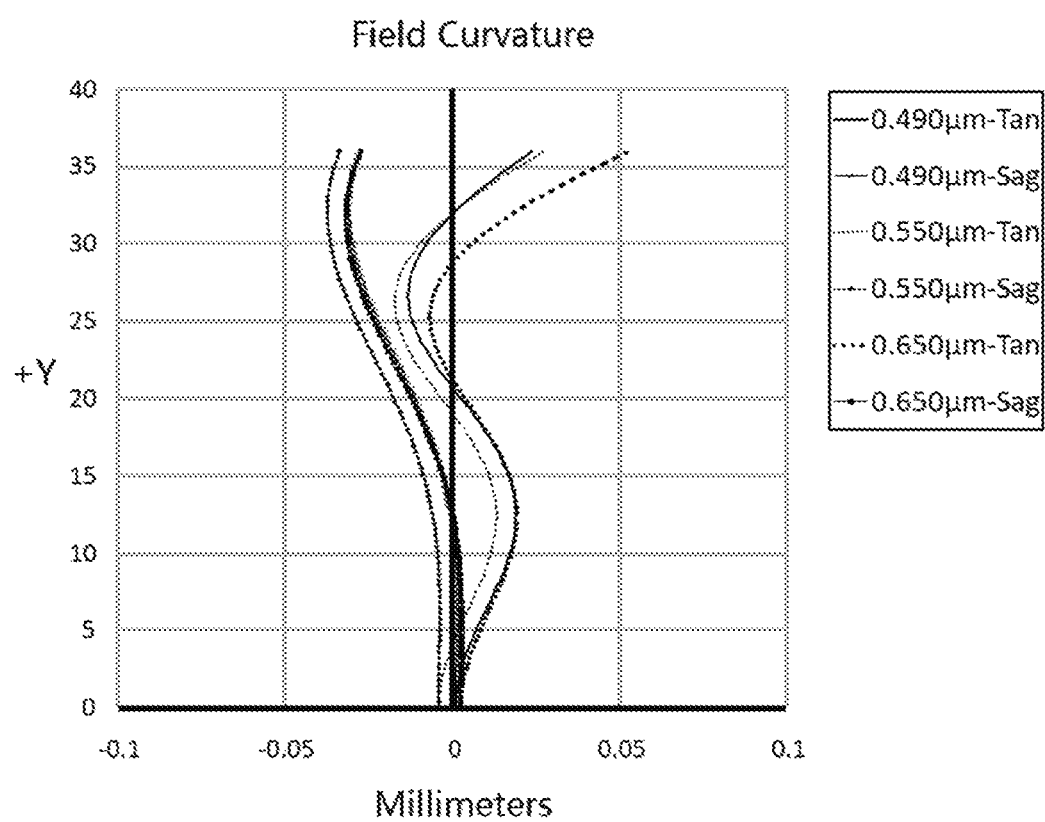
FIG. 22 is a field curvature diagram of the optical lens according to the sixth embodiment of the present disclosure.
Figure 23:
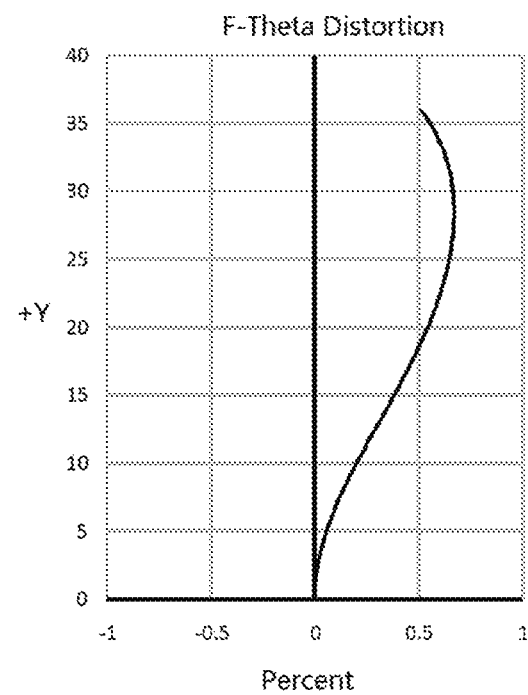
FIG. 23 is a distortion diagram of the optical lens according to the sixth embodiment of the present disclosure.
Figure 24:
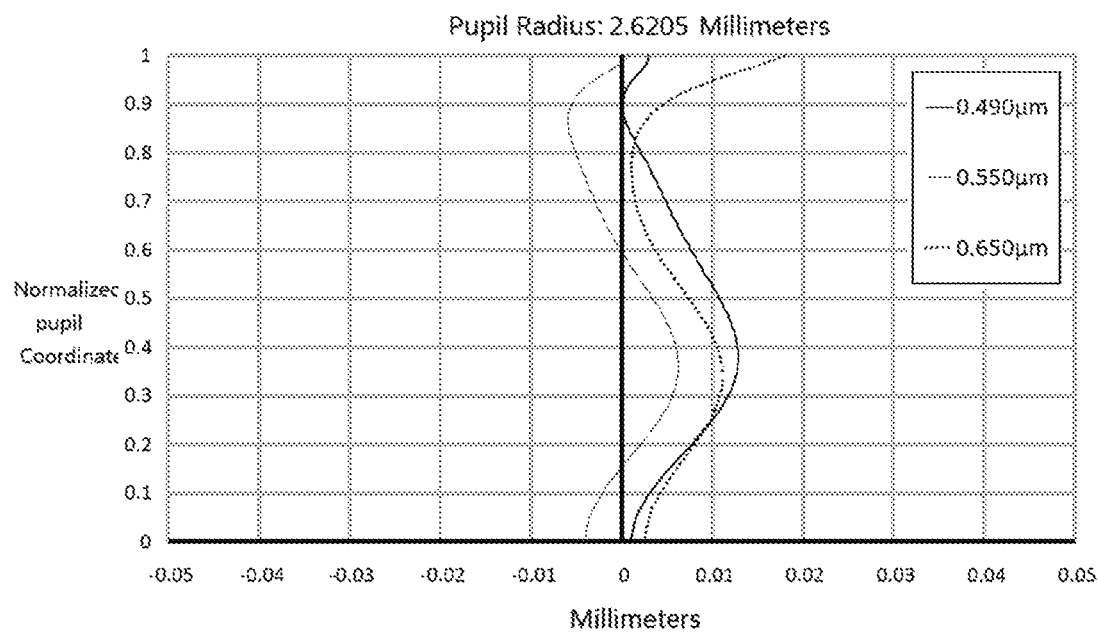
FIG. 24 is an axial chromatic aberration diagram of the optical lens according to the sixth embodiment of the present disclosure.

In this embodiment, the field curvature, the distortion and axial chromatic aberration are respectively shown in FIG. 22. FIG. 23 and FIG. 24. As can be seen from FIG. 22 to FIG. 24, the field curvature, the distortion and the chromatic aberration can be well corrected in this embodiment.

Table 7 shows the above six embodiments and their corresponding optical characteristics. Table 7 includes the system focal length f, the aperture number F #, the FOV 2θ and the system optical total length TTL, and values corresponding to each of the preceding conditional expressions.

TABLE 7

| Condition | First embodiment | Second embodiment | Third embodiment | Fourth embodiment | Fifth embodiment | Sixth embodiment |
|---|---|---|---|---|---|---|
| f (mm) | 7.686 | 7.675 | 7.758 | 7.824 | 7.675 | 7.652 |
| F# | 1.460 | 1.460 | 1.458 | 1.460 | 1.460 | 1.460 |
| 2θ(deg) | 75.0° | 78.0° | 70.0° | 72.0° | 72.0° | 72.0° |
| TTL (mm) | 34.9 | 34.9 | 35.0 | 33.5 | 29.3 | 30.0 |
| $(dn/dt)_4 + (dn/dt)_5$ | −9.4 | −3.8 | −7.5 | −9.5 | −3.1 | −4.2 |
| $Vd_4 + Vd_5$ | 144.965 | 130.428 | 135.852 | 135.852 | 118.075 | 109.973 |
| $\Delta Pg, F_4 + \Delta Pg, F_5$ | 0.039 | 0.010 | 0.019 | 0.019 | 0.010 | 0.010 |
| IH/θ | 0.134 | 0.134 | 0.135 | 0.137 | 0.134 | 0.134 |
| $|r_2 + r_3|$ | 2.297 | 2.133 | 2.471 | 2.147 | 4.196 | 0.868 |
| $f_1/(r_1 + r_2)$ | −0.267 | −0.271 | −0.999 | −1.078 | −2.143 | −0.867 |
| $|f_4/r_8|$ | 1.499 | 0.979 | 0.882 | 0.881 | 2.190 | 2.593 |
| $f_7/r_{13}$ | −0.545 | −1.473 | −0.946 | −1.374 | −0.631 | −0.716 |

In the above embodiments, the optical lens provided by the present disclosure can achieve the following optical index: (1) FOV 2θ>70°; (2) optical total length: TTL<35 mm, (2) applicable spectral range: 400 nm~700 nm.

In the optical lens provided in the present disclosure, the first lens L1 and the second lens L2 are configured for light collection and distortion correction, the third lens L3 is configured to eliminate aberrations and converge the lights to reduce the aperture of the lens, the fourth lens L4 and the cemented body formed by the fifth lens L5 and the six lens L6 can eliminate heat difference, secondary spectrum and achromatic, the seventh lens L7 can eliminate aberrations and control the exit angle of the chief ray.

Further, when each lens are glass lenses, the optical lens has good thermal stability; when at least one of the fourth lens L4 and the fifth lens L5 is selected to the glass having low dispersion and high relative partial dispersion and the temperature coefficients of refractive index is negative, it can not only minimize the focus shift of the imaging lens caused by changes in ambient temperature, effectively solve the problem of thermal drift, but also can well correct the secondary spectrum, and make the focal positions of monochromatic light with different wavelengths closer. The optical lens provided in present disclosure not only has reliable thermal stability, but also has have good effect on monochromatic lights of respective wavelength in the wide visible light range, which is beneficial to the resolution of the optical lens for objects that emit or reflect monochromatic lights of different wavelengths such as signal lights, highway signs, etc.

Seventh Embodiment

Figures 25, 26:
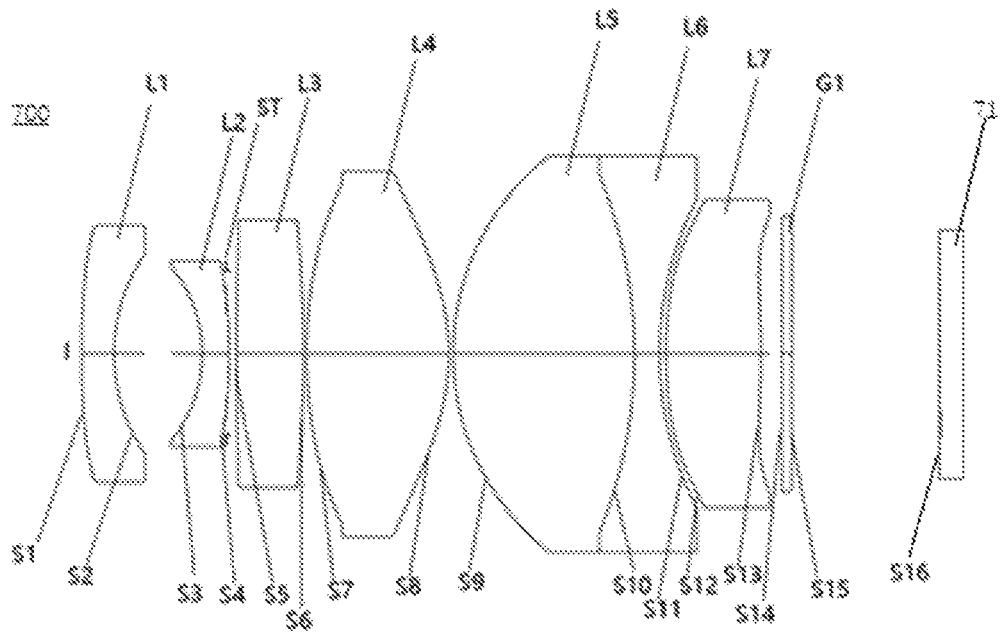
FIG. 25 is a schematic structural diagram of an imaging device according to a seventh embodiment of the present disclosure.
FIG. 26 is a schematic structural diagram showing a cross-section of an imaging module according to an eighth embodiment of the present disclosure.

Please refer to FIG. 25, the present disclosure provides an imaging device 700, which includes the optical lens (100, 200, 300, 400, 500, 600, the optical lens 100 is taken as an example) as shown in any one of the above embodiments and an imaging element 71 for converting an optical image formed by the optical lens 100 into electrical signals. The optical lens 100 and the imaging element 71 are cooperated to capture one or more images.

The imaging element 71 is located on an imaging surface of the optical lens. The imaging element 71 may be a Complementary Metal Oxide Semiconductor (CMOS) image sensor or a Charge Coupled Device (CCD) image sensor.

The imaging device 700 may be a device such as a vehicle-mounted device, a monitoring device, and the like, and has beneficial effects that the optical lens provided in present disclosure can bring.

Eighth Embodiment

FIG. 26 illustrates an imaging module 800, which includes the optical lens (100, 200, 300, 400, 500, 600, the optical lens 100 is taken as an example) as shown in any one of the above embodiments, a barrel 801, a holder 802, an image sensor 803, and a printed circuit board 804. The optical lens 100 is received in the barrel 801, and the barrel 801 is engaged with the holder 802. The image sensor 803 and the printed circuit board 804 are substantially accommodated in the holder 802. The image sensor 803 is located on an imaging surface of the optical lens 100 and is mounted on the printed circuit board 804. The image sensor 803 is configured for converting light signals into images, thereby the images formed by the optical lens 100 can be converted and transmitted to a processor. The image sensor 803 may be a Complementary Metal Oxide Semiconductor (CMOS) image sensor or a Charge Coupled Device (CCD) image sensor. The printed circuit board 804 can be further electrically connected to a chip or a processor via a flexible circuit board.

Ninth Embodiment

Figure 27:
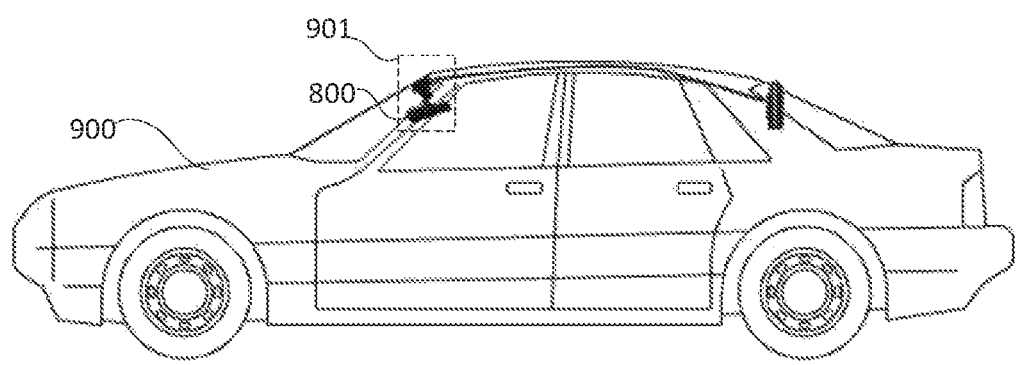
FIG. 27 is a schematic structural diagram of a vehicle camera according to a ninth embodiment of the present disclosure.

As illustrated in FIG. 27, the present disclosure provides a vehicle camera 901 mounted in a vehicle 900. The vehicle camera 901 includes the imaging module 800 and is configured to capture images of the surroundings of the vehicle 900. The vehicle camera 901 can be applied to a driverless vehicle system, so that the driverless vehicle system can control the direction or the speed of the vehicle 900 according to the captured images of the surroundings.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed is:

1. An optical lens, from an object side to an imaging surface thereof, the optical lens sequentially comprising:
    a first lens having a negative refractive power, an object side surface of the first lens being a convex surface and an image side surface of the first lens being a concave surface;
    a second lens having a negative refractive power, an object side surface of the second lens being a concave surface;
    a stop;
    a third lens having a positive refractive power, an object side surface of the third lens being a convex surface;
    a fourth lens having a positive refractive power,
    a fifth lens having a positive refractive power, an object side surface and an image side surface of the fifth lens each being convex surfaces;
    a sixth lens having a negative refractive power, an object side surface and an image side surface of the sixth lens each being concave surfaces, the fifth lens and the sixth lens being cemented into a cemented body; and
    a seventh lens having a positive refractive power;
    wherein the optical lens meets the expression:

$$IH/\theta<0.15;$$

where $\theta$ represents half field of view of the optical lens, and IH represents an image height when the half field of view is $\theta$.

2. The optical lens as claimed in claim 1, wherein the fourth lens and the fifth lens meet the expression:

$$(dn/dt)_4+(dn/dt)_5<-3\times10^{-6}/°\ C.;$$

where $(dn/dt)_4$ represents a temperature coefficient of refractive index of the fourth lens, $(dn/dt)_5$ represents a temperature coefficient of refractive index of the fifth lens.

3. The optical lens as claimed in claim 1, wherein the fourth lens and the fifth lens meet the expressions:

$$Vd_4-Vd_5>100;$$

$$\Delta Pg\cdot F_4+\Delta Pg\cdot F_5\geq 0.01;$$

where $Vd_4$ represents the abbe number of the fourth lens, $Vd_5$ represents the abbe number of the fifth lens, $\Delta Pg\cdot F_4$ represents a deviation of relative partial dispersion from the abbe empirical formula of the fourth lens, $\Delta Pg\cdot F_5$ represents a deviation of relative partial dispersion from the abbe empirical formula of the fifth lens.

4. The optical lens as claimed in claim 1, wherein the optical lens meets the expression:

$$0.5<|r_2+r_3|<5;$$

where $r_2$ represents a radius of curvature of an image side surface of the first lens, $r_3$ represents a radius of curvature of an object side surface of the second lens.

5. The optical lens as claimed in claim 1, wherein the first lens meets the expression:

$$-3<f_1/(r_1+r_2)<0;$$

where $f_1$ represents a focal length of the first lens, $r_1$ represents a radius of curvature of an object side surface of the first lens, $r_2$ represents a radius of curvature of an image side surface of the first lens.

6. The optical lens as claimed in claim 1, wherein the fourth lens meets the expression:

$$0<|f_4/r_8|<3;$$

where $f_4$ represents a focal length of the fourth lens, $r_8$ represents a radius of curvature of an image side surface of the fourth lens.

7. The optical lens as claimed in claim 1, wherein the seventh lens meets the expression:

$$-2<f_7/r_{13}<0;$$

where $f_7$ represents a focal length of the seventh lens, $r_{13}$ represents a radius of an image side surface of the seventh lens.

8. The optical lens as claimed in claim 1, wherein an image side surface of the seventh lens is a convex surface.

9. The optical lens as claimed in claim 1, wherein the first lens, the second lens, the third lens, the fourth lens, the fifth lens, the sixth lens and the seventh lens are glass lenses.

10. The optical lens as claimed in claim 9, wherein the seventh lens is a glass aspheric lens, the fifth lens and the sixth lens are glass spherical lenses.

11. An imaging module, comprising an optical lens and an image sensor located on an imaging surface of the optical lens, wherein the optical lens comprises:
    a first lens having a negative refractive power and a convex surface facing the object side;
    a second lens having a negative refractive power and a concave surface facing the object side;
    a stop;
    a third lens having a positive refractive power and a convex surface facing the object side;
    a fourth lens having a positive refractive power,
    an achromatic doublet lens, comprising a fifth lens with a positive refractive power and a sixth lens with a negative refractive power, an image side surface of the fifth lens being matched with and bonded to an object side surface of the sixth lens; and
    a seventh lens having a positive refractive power;
    wherein the first lens satisfies the following expression:

$$-3<f_1/(r_1+r_2)<0;$$

where $f_1$ represents a focal length of the first lens, $r_1$ represents a radius of curvature of an object side surface of the first lens, $r_2$ represents a radius of curvature of an image side surface of the first lens.

12. The imaging module as claimed in claim 11, wherein the fourth lens and the fifth lens satisfy the following expression:

$$(dn/dt)_4+(dn/dt)_5<-3\times10^{-6}/°\ C.;$$

where $(dn/dt)_4$ represents a temperature coefficient of refractive index of the fourth lens, $(dn/dt)_5$ represents a temperature coefficient of refractive index of the fifth lens.

13. The imaging module as claimed in claim 12, wherein the fourth lens and the fifth lens satisfy the following expressions:

$$Vd_4+Vd_5>100;$$

$$\Delta Pg\cdot F_4+\Delta Pg\cdot F_5\geq 0.01;$$

where $Vd_4$ represents the abbe number of the fourth lens, $Vd_5$ represents the abbe number of the fifth lens, $\Delta Pg\cdot F_4$ represents a deviation of relative partial dispersion from the abbe empirical formula of the fourth lens, ΔPg·F₅ represents a deviation of relative partial dispersion from the abbe empirical formula of the fifth lens.

14. The imaging module as claimed in claim 11, wherein the optical lens satisfies the following expression:

$$IH/\theta < 0.15;$$

where θ represents half field of view of the optical lens, and IH represents an image height when the half field of view is θ.

15. The imaging module as claimed in claim 11, wherein the optical lens satisfies the following expression:

$$0.5 < |r_2 + r_3| < 5;$$

where $r_2$ represents a radius of curvature of an image side surface of the first lens, $r_3$ represents a radius of curvature of an object side surface of the second lens.

16. The imaging module as claimed in claim 11, wherein the fourth lens satisfies the following expression:

$$0 < |f_4/r_8| < 3;$$

where $f_4$ represents a focal length of the fourth lens, $r_8$ represents a radius of curvature of an image side surface of the fourth lens.

17. The imaging module as claimed in claim 11, wherein the seventh lens satisfies the following expression:

$$-2 < f_7/r_{13} < 0;$$

where $f_7$ represents a focal length of the seventh lens, $r_{13}$ represents a radius of an image side surface of the seventh lens.

18. A vehicle camera, comprising an optical lens and an image sensor, wherein the optical lens and the image sensor are cooperated to capture one or more images of the surroundings of a vehicle, from an object side to an imaging surface, the optical lens sequentially comprises:
  a first lens with a negative refractive power, an object side surface of the first lens being convex and an imaging side surface of the first lens being concave;
  a second lens with a negative refractive power an object side surface of the second lens being concave;
  a stop;
  a third lens with a positive refractive power, an object side surface of the third lens being convex;
  a fourth lens having a positive refractive power;
  an achromatic doublet lens, comprising a fifth lens with a positive refractive power and a sixth lens with a negative refractive power, an object side surface and an image side surface of the fifth lens each being convex, an object side surface and an image side surface of the sixth lens each being concave; and
  a seventh lens with a positive refractive power;
  wherein the optical lens meets the expressions:

$$IH/\theta < 0.15;$$

$$0.5 < |r_2 + r_3| < 5;$$

$$-3 < f_1/(r_1 + r_2) < 0;$$

$$0 < |f_4/r_8| < 3;$$

$$-2 < f_7/r_{13} < 0;$$

where θ represents half field of view of the optical lens, IH represents an image height when the half field of view is θ, $r_2$ represents a radius of curvature of an image side surface of the first lens, $r_3$ represents a radius of curvature of an object side surface of the second lens, $f_1$ represents a focal length of the first lens, $r_1$ represents a radius of curvature of an object side surface of the first lens, $f_4$ represents a focal length of the fourth lens, $r_8$ represents a radius of curvature of an image side surface of the fourth lens, $f_7$ represents a focal length of the seventh lens, $r_{13}$ represents a radius of an image side surface of the seventh lens.

19. The optical lens as claimed in claim 1, wherein an optical total length of the optical lens is smaller than and equal to 35 mm and greater than and equal to 29.3 mm.

20. The optical lens as claimed in claim 1, wherein a field of view of the optical lens is greater than and equal to 70 degrees and smaller than and equal to 78 degrees.

* * * * *